United States Patent
Peters et al.

(10) Patent No.: US 9,481,270 B2
(45) Date of Patent: Nov. 1, 2016

(54) FITTING FOR A VEHICLE SEAT AND VEHICLE SEAT

(71) Applicant: Johnson Controls Components GmbH & Co. KG, Kaiserslautern (DE)

(72) Inventors: Christoph Peters, Wermelskirchen (DE); Ulrich Lehmann, Alfter (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 16 days.

(21) Appl. No.: 14/417,940

(22) PCT Filed: Sep. 27, 2013

(86) PCT No.: PCT/EP2013/070151
§ 371 (c)(1),
(2) Date: Jan. 28, 2015

(87) PCT Pub. No.: WO2014/053400
PCT Pub. Date: Apr. 10, 2014

(65) Prior Publication Data
US 2015/0298585 A1    Oct. 22, 2015

(30) Foreign Application Priority Data

Oct. 4, 2012 (DE) .................. 10 2012 019 698
Nov. 22, 2012 (DE) .................. 10 2012 023 057

(51) Int. Cl.
*B60N 2/235* (2006.01)
*B60N 2/20* (2006.01)
*B60N 2/44* (2006.01)

(52) U.S. Cl.
CPC ............. *B60N 2/2356* (2013.01); *B60N 2/20* (2013.01); *B60N 2/235* (2013.01); *B60N 2/4435* (2013.01)

(58) Field of Classification Search
CPC ... B60N 2/2356; B60N 2/235; B60N 2/4435
USPC .................. 297/366, 354.1, 367 R
See application file for complete search history.

(56) References Cited

U.S. PATENT DOCUMENTS 7,571,963 B2 *   8/2009   Peters ............. B60N 2/2356
                                                          267/156
7,614,700 B2 *  11/2009   Peters ............. B60N 2/2356
                                                         297/367 P (Continued)

FOREIGN PATENT DOCUMENTS

DE           44 19 411 A1     12/1995
DE     10 2005 046 806 B3      4/2007

(Continued)

*Primary Examiner* — Chi Q Nguyen
(74) *Attorney, Agent, or Firm* — McGlew and Tuttle, P.C.

(57) ABSTRACT

A vehicle seat fitting has a fitting parts (11, 12) have a sprocket (17) and guide segments (14), a bar (16) guided by the guide segments between a locked and unlocked state that interact with the sprocket. The bar has bar cams (16a, 16b). An eccentric (27) is rotatably mounted around a rotation axis (A) and in a transition from unlocked to the locked, engages the bar with a force for clamping the bar against the sprocket. The eccentric has eccentric cams (28, 128) interacting with the bar cams. The first eccentric cam has a cam section (28.2) which runs in the peripheral direction concentrically around the axis. The cam section is arranged upstream in the closing direction of a further cam section (28.4) that has a cam contour running radially outwards downstream in the closing direction relative to the concentrically peripheral contour for clamping the bar against the sprocket.

15 Claims, 7 Drawing Sheets

(56) References Cited

U.S. PATENT DOCUMENTS

| | | | |
|---|---|---|---|
| 7,677,677 B1* | 3/2010 | Roberts | B60B 7/0046 301/37.371 |
| 8,256,843 B2* | 9/2012 | Iguchi | B60N 2/2356 29/446 |
| 8,267,476 B2* | 9/2012 | Kumazaki | B60N 2/20 297/367 P |
| 8,720,999 B2* | 5/2014 | Peters | B60N 2/2356 297/367 L |
| 8,931,843 B2* | 1/2015 | Schuler | B60N 2/2252 297/367 R |
| 9,216,668 B2* | 12/2015 | Teufel | B60N 2/2356 |
| 9,216,669 B2* | 12/2015 | Peters | B60N 2/682 |
| 2012/0169105 A1* | 7/2012 | Assmann | B60N 2/2356 297/367 P |
| 2014/0110984 A1* | 4/2014 | Assmann | B60N 2/20 297/354.1 |
| 2014/0132053 A1* | 5/2014 | Schuler | B60N 2/2356 297/367 P |
| 2014/0333114 A1* | 11/2014 | Peters | B60N 2/2356 297/463.1 |

FOREIGN PATENT DOCUMENTS

| | | |
|---|---|---|
| DE | 20 2010 015 093 U1 | 1/2011 |
| DE | 10 2009 041 492 A1 | 3/2011 |
| DE | 10 2010 053 525 B3 | 3/2012 |
| EP | 1 591 303 A2 | 11/2005 |
| JP | 2001 204572 A | 7/2001 |
| WO | 2007/039001 A1 | 4/2007 |

* cited by examiner

FITTING FOR A VEHICLE SEAT AND VEHICLE SEAT

CROSS REFERENCE TO RELATED APPLICATIONS

This application is a United States National Phase Application of International Application PCT/EP2013/070151 filed Sep. 27, 2013 and claims the benefit of priority under 35 U.S.C. §119 of German Patent Applications DE 10 2012 019 698.9 filed Oct. 4, 2012 and DE 10 2012 023 057.5 filed Nov. 22, 2012, the entire contents of which are incorporated herein by reference.

FIELD OF THE INVENTION

The invention relates to a fitting for a vehicle seat, in particular for a motor vehicle seat, having a first fitting part and a second fitting part which are able to be rotated relative to one another about an axis, wherein a toothed ring is formed on the first fitting part and guide segments are formed on the second fitting part, at least one locking bar which is radially displaceably guided by means of the guide segments between a locked state and an unlocked state, and which in the locked state cooperates with the toothed ring in order to lock the fitting, wherein the at least one locking bar has a first locking cam and a second locking cam, and a rotatably mounted eccentric which during the transition from the unlocked state into the locked state by being rotated in a closing direction subjects the locking bar to a force for clamping the locking bar against the toothed ring.

BACKGROUND OF THE INVENTION

Generic fittings have at least one locking bar and one rotatable eccentric. The eccentric holds the at least one locking bar, in a manner in which it is spring-loaded, in engagement with a toothing of a toothed ring. The eccentric contour is designed to be self-locking, i.e. a transmission of force from the toothed segment to the eccentric under static load conditions or impulse loads does not lead to a rotation of the eccentric and as a result does not lead to an opening of the fitting. Unfavorable load conditions, however, in particular cyclical or vibratory stresses, may lead under adverse conditions to an undesired rotation of the eccentric and as a result to an undesired opening of the fitting.

When mounting a generic fitting, an eccentric angle which defines the angular position of the eccentric relative to a component of the fitting which is fixed in terms of rotation is used to monitor a fully locked position. Known eccentrics have the drawback that it is difficult to detect whether the measured eccentric angle is still within an admissible eccentric angular range defined by permitted component tolerances. Inaccuracies in terms of measurements and/or readings of the eccentric angle may lead to a false assessment of the fitting.

A generic fitting is disclosed in DE 10 2010 053 525 B3 in which, in a first contact point between a first eccentric cam and a first locking cam, a first wedge angle is defined, said first wedge angle being positive, and in a second contact point which is produced only under load between the second eccentric cam and the second locking cam, a second wedge angle is defined, said second wedge angle being negative. The positive wedge angle on the first cam pair serves for locking the locking bar and for compensating for tolerances. A normal force with an opening component transmitted from the locking bar via the first cam pair to the eccentric is compensated by frictional forces in a self-locking manner. The negative wedge angle on the second cam pair serves for blocking the rotation of the eccentric under load, as the normal force in this case has a closing component. In practice, it has been shown that this system consisting of a first and second wedge angle is very sensitive to tolerances.

A fitting with a locking bar is disclosed in DE 44 19 411 A1, said locking bar in each case having a bearing surface in two partial regions of the locking bar offset axially and radially to one another. An eccentric is provided for locking the locking bar and thus the fitting, said eccentric being floatingly coupled to a drive bushing. The eccentric comprises a cam with a clamping surface which continuously rises from one end to the other end of the cam and cooperates in a locking manner with one of the two bearing surfaces. The drive bushing comprises a further cam with a concentric interception surface which cooperates with the other of the two bearing surfaces. The two cams in the peripheral direction are only slightly offset relative to one another and during the locking of the fitting are rotated at the same time below the assigned bearing surfaces. As a result, with a small angle of rotation of the eccentric, the cam already bears with the clamping surface against the locking bar. This small angle of rotation makes it complicated to assess the locked state of the fitting in a reliable manner by using the eccentric angle.

EP 1 591 303 A2 discloses a further fitting with an eccentric which has two eccentric cams for supporting a locking bar. It is not disclosed how the eccentric cams have to be designed so that the locked state of the fitting may be assessed reliably using the eccentric angle.

SUMMARY OF THE INVENTION

An object of the invention is to improve a fitting of the type mentioned in the introduction, in particular to design said fitting so that it is less sensitive to tolerances. Secure locking is intended to be ensured even under unfavorable load conditions, and a simpler option is provided to assess the locked state of the fitting reliably using the eccentric angle. An object of the invention is to improve a vehicle seat by using a fitting with optimized locking security.

According to the invention, a fitting for a vehicle seat, in particular for a motor vehicle seat is provided comprising a first fitting part and a second fitting part which are able to be rotated relative to one another about an axis. A toothed ring is formed on the first fitting part and guide segments are formed on the second fitting part. At least one locking bar is radially displaceably guided, by means of the guide segments, between a locked state and an unlocked state. In the locked state the at least one locking bar cooperates with the toothed ring in order to lock the fitting. The at least one locking bar has a first locking cam and a second locking cam. A rotatably mounted eccentric, which during the transition from the unlocked state into the locked state by being rotated in a closing direction, subjects the locking bar to a force for clamping the locking bar against the toothed ring. For acting on the locking bar the eccentric has a first eccentric cam which is suitable for cooperating with the first locking cam and a second eccentric cam which is suitable for cooperating with the second locking cam. The first eccentric cam has a cam portion which extends in the peripheral direction concentrically about the axis. The cam portion extending concentrically about the axis is arranged counter to the closing direction in front of a further cam portion of the first eccentric cam. The further cam portion counter to the closing direction has a cam contour which extends radially outwardly relative to a concentric peripheral contour, for clamping the locking bar against the toothed ring.

As the first eccentric cam has a cam portion which extends in the peripheral direction concentrically about the axis and as said cam portion extending concentrically about the axis is arranged counter to the closing direction in front of a further cam portion of the first eccentric cam, and the further cam portion counter to the closing direction has a cam contour extending radially outwardly relative to a concentric peripheral contour, for clamping the locking bar in the toothed ring, it is achieved that the eccentric of a fitting with inadmissibly high tolerances in the locked state, in comparison with a fitting with components of nominal size, has a rotational angular deviation in the direction of an open fitting which is able to be measured in a clear and reliable manner.

The directional information used "counter to the closing direction" is of equivalent meaning to a viewing direction counter to the closing direction. When rotating the eccentric in the closing direction, the front cam portions counter to the closing direction accordingly reach the assigned locking cams first.

In the unlocked state, irrespective of the exemplary embodiment, the eccentric of the fitting is rotated sufficiently far counter to the closing direction and the locking bar is moved sufficiently far radially inwardly that the first locking cam of the locking bar pulled radially inwardly is located in an intermediate space between side contours of the first and second eccentric cams extending in the radial direction. If, during locking and due to a first locking cam located too far radially on the inside, the eccentric is no longer able to reach its designated locked position, as the first eccentric cam with the concentric cam portion in the radial direction does not fit below the first locking cam, the eccentric remains open at least by an eccentric angle measurement which is able to be measured in a reliable manner and which corresponds to the length of the concentric cam portion. This angular step is able to be identified more easily than if the eccentric rotational angle were to be continuously altered and only a limit for the permitted angular value were to be set. This simplifies the assessment of the mounted fittings relative to the reliable function thereof.

In comparison with the prior art, as the first eccentric cam has a cam portion which in the peripheral direction extends concentrically about the axis A, a negative wedge angle on a second cam pair may be dispensed with. As a result, the system is less sensitive to tolerances.

The introduction of a precisely concentric cam portion (zero degree contour) on the first eccentric cam is the preferred solution. The term concentric also encompasses here quasi-concentric cam portions which have a very small angle between a tangent on the quasi-concentric cam portion and a circular arc extending about the axis of the eccentric, which ideally is approximately half as big or smaller than the angle in a fourth cam portion of the locking contour of the first eccentric cam. By means of the reduced angle, smaller force components are produced in the opening rotational direction of the eccentric and greater frictional force components which hold the eccentric in the locked position are produced.

If under adverse conditions the eccentric were to be subjected to opening forces, a potentially undesired eccentric movement will stop after an eccentric rotational angle of preferably ca. 4°(alternatively up to ca. 8°) with the contact of the first locking cam on the concentric contact point of the first eccentric cam. Thus, a sufficient locking of the fitting is ensured.

The concentric contact surface leads to a slight increase in operating force during the unlocking of the fitting and thus provides an easily perceivable indicator as to when the unlocking point is reached and the fitting released. After leaving the concentric contact surface an actuation is carried out again with lower operating force. This advantageously leads to a clearer measurement result by means of the specific force path/rotational angle path during a functional test of the fitting.

Preferably, the first eccentric cam has a first cam portion which defines a control contour by means of a rounded portion of a first flank of the eccentric cam extending substantially in the radial direction, with a contour of the eccentric cam extending substantially in the peripheral direction, said control contour controlling the introduction of the locking bar into the toothed ring, whilst the eccentric rotates in the closing direction. Advantageously, a second cam portion, which is directly adjacent to the first cam portion and which extends in the peripheral direction concentrically about the axis A, forms the concentric cam portion.

For providing a free pivoting function, the locked state of the fitting may be coupled to a locked state of a further fitting, so that when the fitting is open, the further fitting is also held open thereby via a coupling means, in particular a Bowden cable. An additional cam portion between the first cam portion and the second cam portion of the first eccentric cam of the fitting in this case compensates for clearance and tolerances potentially present in the coupling means.

The fourth cam portion is characterized by a cam contour extending slightly radially outwardly relative to the peripheral direction—counter to the closing direction—which extends in a wedge angle which is preferably 4° to 6°. The wedge angle requires that the regions of the fourth cam portion trailing in the closing direction protrude further radially outwards than the leading regions so that the locking bar acted upon by the first eccentric cam may be locked and compensation of tolerances is possible. The region of the fourth cam portion, which leads in the closing direction, reaches the assigned first eccentric cam first during the locking procedure so that subsequently the cam contour extending radially outwardly presses the locking bar outwardly.

The contour of the first locking cam is reliably prevented from becoming caught on the contour of the first eccentric cam during the rotation of the eccentric by the fitting between the second cam portion and the fourth cam portion having a third cam portion which connects together the second cam portion and the fourth cam portion continuously, in particular continuously without edges.

The strength of the fitting according to the invention may be increased in the locked unloaded state of the fitting by the first eccentric cam being in contact with the first locking cam in a first contact point and a gap of, in particular, 0.05 to 0.5 mm existing between the second eccentric cam and the second locking cam. In the locked loaded state of the fitting, in particular when the vehicle seat is subjected to high forces due to a crash, the locking bar is tilted between the guide segments so that, as a result, in addition to the contact between the first eccentric cam and the first locking cam in the first contact point, the locking bar is tilted and in a second contact point the second eccentric cam is in contact with the second locking cam.

The concentric cam portion of the first eccentric cam is advantageously combined with a tilting of a total of four locking bars in opposing directions. For two respective radially opposing locking bars, the first eccentric cams are arranged on the eccentric in the closing direction as the leading eccentric cams relative to the second eccentric cams; for the two other locking bars the first eccentric cams are arranged on the eccentric in the closing direction as the trailing eccentric cams relative to the second eccentric cams. Under load, when the fitting is locked, each locking bar tilts in the direction opposing the respectively adjacent locking bars. Thus, a tilting of two locking bars is ensured for both loading directions which increases the strength.

The concentric cam portion is advantageously only formed on the first eccentric cams; the second eccentric cams have no contact with the second locking cams in the resting state and are formed without a concentric cam portion. In principle, however, it is also possible for all locking cams of one eccentric to be provided with a concentric cam portion.

In a fitting which has at least two locking bars and just one eccentric with at least two first eccentric cams, it is sufficient if only one first eccentric cam of the at least two first eccentric cams has a cam portion extending concentrically about the axis and the remaining first eccentric cams, which have a cam portion extending concentrically about the axis, are configured so as to be correspondingly shorter in the peripheral direction.

The strength of a vehicle seat with a seat part and a backrest which are connected together by means of at least one fitting may be optimized by using a fitting according to the invention. Due to the locked state of the fitting which is able to be tested in a reliable manner, the safety of the vehicle seat is further increased.

The invention is described in more detail with reference to two advantageous exemplary embodiments shown in the drawings. The invention is, however, not limited to these exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
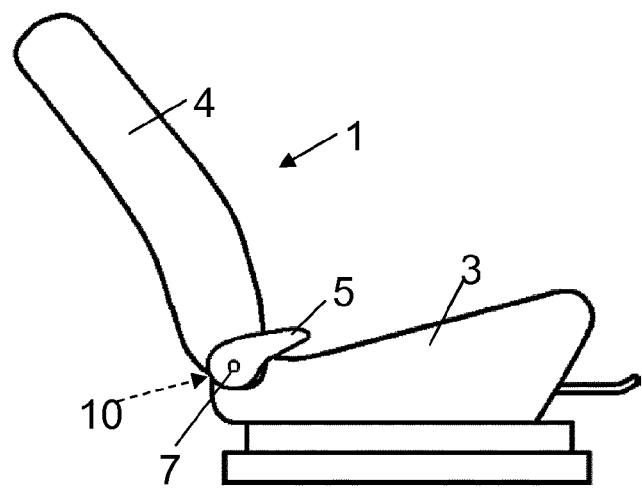
FIG. 1 is a schematic view of a vehicle seat with a fitting according to a first exemplary embodiment.
Figure 2:
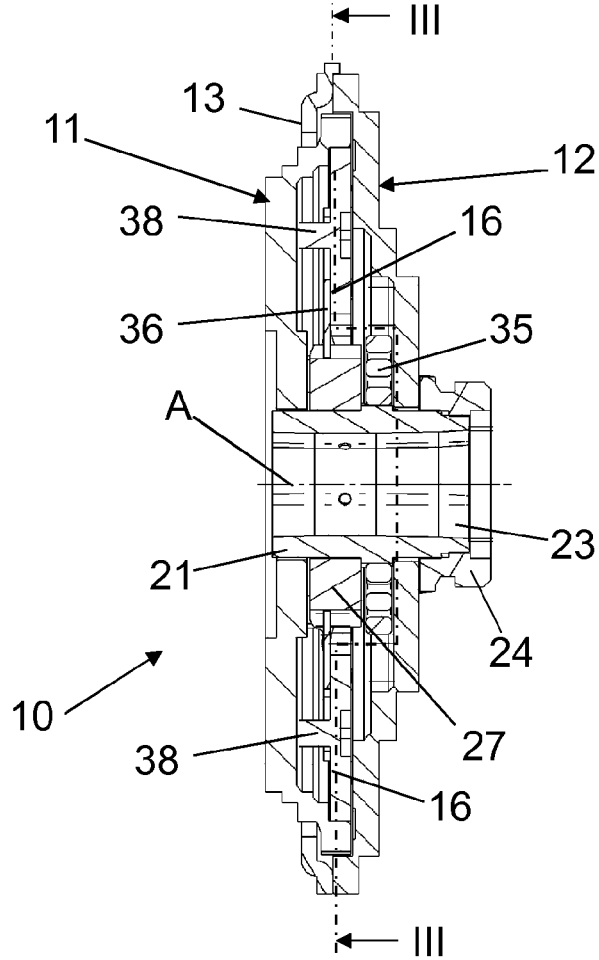
FIG. 2 is an axial sectional view through the first exemplary embodiment.
Figure 3:
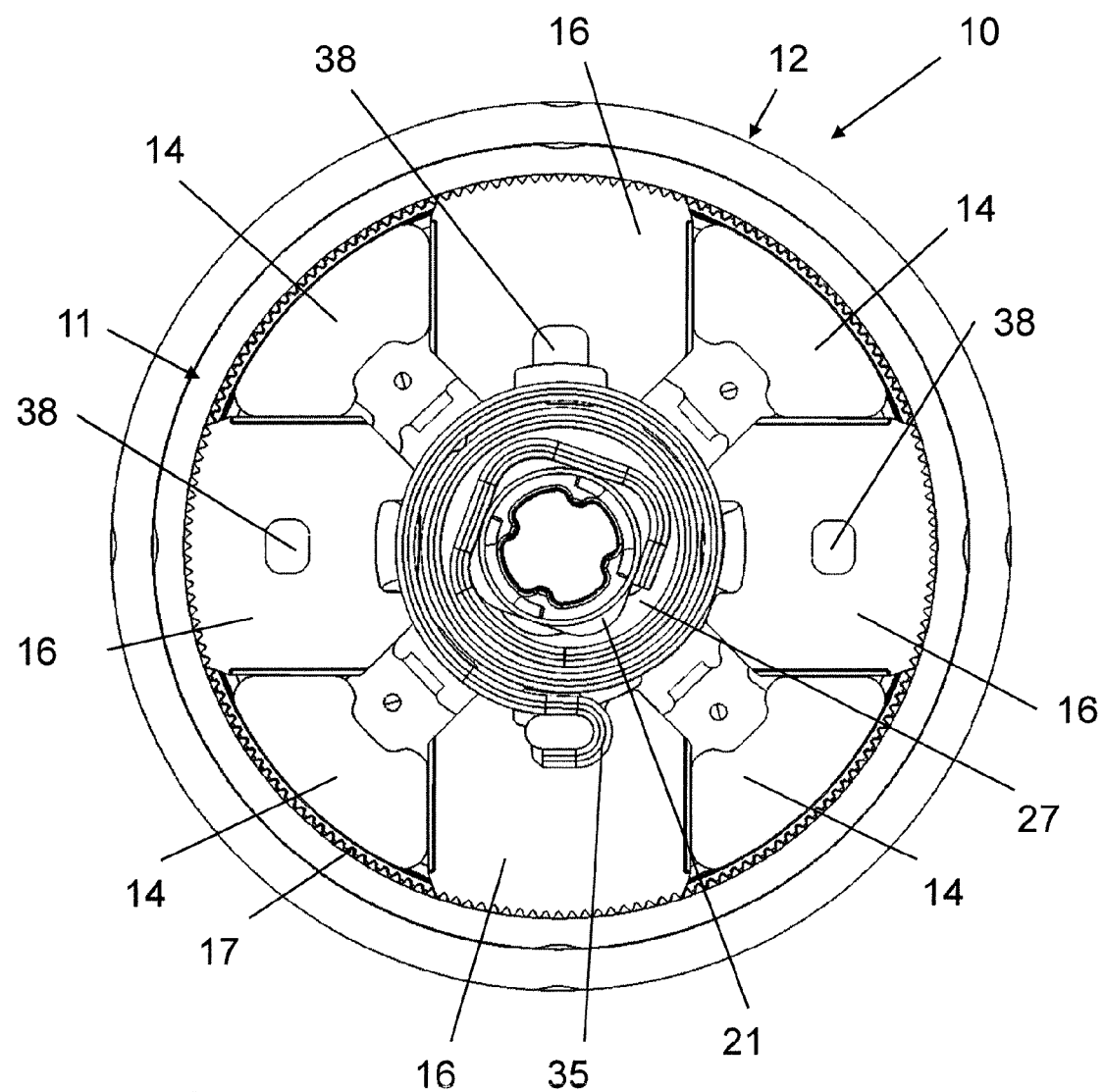
FIG. 3 is a radial sectional view through the first exemplary embodiment along the line III-III in FIG. 2.

A vehicle seat 1 for a motor vehicle has a seat part 3 and a backrest 4 which is able to be adjusted in its inclination relative to the seat part 3. For adjusting the inclination of the backrest 4, a transmission rod 7 is rotated manually, for example by means of a first hand lever 5, said transmission rod being arranged horizontally in the transition region between the seat part 3 and the backrest 4. On both sides of the vehicle seat 1 the transmission rod 7 engages in a fitting 10. The transmission rod 7 defines the directional information of a cylinder coordinate system used.

The fitting 10 has a first fitting part 11 and a second fitting part 12 which are able to be rotated relative to one another about an axis A. The axis A in the present case is aligned with the central axis of the transmission rod 7. The two fitting parts 11 and 12 may in each case approximately describe a circular disk shape. Both fitting parts 11 and 12 preferably consist of metal, in particular steel, which may be at least partially hardened. For receiving the axially acting forces, i.e. for axially holding together the fitting parts 11 and 12, a clasping ring 13 is provided. The clasping ring 13 preferably consists of metal, in particular steel, which is preferably unhardened. The clasping ring 13 preferably has a substantially planar annular shape but in an alternative embodiment may be profiled in an L-shape with a cylinder portion and a planar annular portion on the front face.

The clasping ring 13 is connected fixedly to one of the two fitting parts 11 and 12, in the present case in an outer annular portion to the second fitting part 12, for example by means of laser welding or by means of a further fastening technique known per se. By means of an internal annular portion which is arranged in a plane perpendicular to the axial direction, the clasping ring 13, optionally by the interposition of a sliding ring, encompasses the first fitting part 11 in the radial outer edge region thereof, without hindering the relative movement of the two fitting parts 11 and 12. Additionally, the inner surfaces of the two fitting parts 11 and 12 facing one another are protected from the penetration of foreign bodies and soiling and damage.

The clasping ring 13, and the fitting part 11 or 12 fixedly connected thereto, thus clamp the other of the two fitting parts 11 and 12 which is movable relative thereto. In terms of construction, therefore, the two fitting parts 11 and 12 together form a disk-shaped unit (with the clasping ring 13).

When mounting the fitting 10, the first fitting part 11, for example, is fixedly connected to the structure of the backrest 4, i.e. fixed to the backrest. The second fitting part 12 is then fixedly connected to the structure of the seat part 3, i.e. fixed to the seat part. The assignments of the fitting parts 11 and 12 may however also be exchanged, i.e. the first fitting part 11 could then be fixed to the seat part and the second fitting part 12 fixed to the backrest. The fitting 10 is located in the flux of force between the backrest 4 and the seat part 3.

The fitting 10 is configured as a latching fitting in which the first fitting part 11 and the second fitting part 12 are able to be locked together as disclosed, for example, in DE 10 2006 015 560 B3, the relevant disclosure thereof being expressly included therein.

The second fitting part 12 has—in the present case four—guide segments 14, which with straight guide surfaces in each case guide in pairs a locking bar 16 laterally in the radial direction. The locking bars 16—in the present case four—are arranged offset to one another—in the present case respectively by 90°—in a constructional space defined between the two fitting parts 11 and 12. The locking bars 16 are provided on their radially external end with a toothing which may come into (fall into) engagement with a toothed ring 17 of the first fitting part 11 configured as an internal gear. If the toothed ring 17 and the locking bars 16 cooperate, the fitting 10 is locked. In an alternative embodiment, the number of locking bars is one, two, three or more than four locking bars.

The first fitting part 11 is arranged in a recess of the second fitting part 12 and is radially externally encompassed thereby, whereby the two fitting parts 11 and 12 bear one another. In this case, the radial external edge region of the first fitting part 11 with the toothed ring 17 is arranged in the radial direction between the guide segments 14 and the radial external edge region of the second fitting part 12 (serving for bearing the first fitting part 11). In the case of high loads, for example in the event of a crash, the first fitting part 11—after deformation—may come to bear with its toothed ring 17 against the guide segments 14 located closer in the loading direction, which have correspondingly (concentrically) curved surfaces in the direction of the toothed ring 17. This increases the strength of the fitting 10.

The first fitting part 11 may be mounted in the second fitting part 12. The relationships could, however, also be reversed, i.e. the second fitting part 12 may be mounted on the first fitting part 11. In principle, both arrangements are equivalent.

A drive element 21, for example made of plastics material, is arranged in the center of the fitting 10, said drive element being rotatably mounted on at least one of the two fitting parts 11 and 12, in the present case the first fitting part 11, more specifically in a central opening thereof. On both vehicle seat sides the drive element 21 is connected fixedly in terms of rotation or at least coupled for entrainment to the transmission rod 7 which is inserted in a bore 23 of the hollow drive element 21 and on which the first hand lever 5 is located fixedly in terms of rotation. At one end of the drive element 21, in the present case that on the second fitting part 12, a fastening ring 24 is provided, in the present case said fastening ring consisting of plastics material and preferably being fastened by means of ultrasound welding to the drive element 21. The first hand lever 5 may be clipped securely and fixedly in terms of rotation on the fastening ring 24. The fastening ring 24 may also be provided at the other end of the drive element 21 or in each case at both ends.

An eccentric 27 which is arranged in the constructional space defined between the fitting parts 11 and 12 is located fixedly in terms of rotation or at least coupled for entrainment on the drive element 21. The eccentric 27 has along its external periphery for each locking bar 16, i.e. in the present case multiplied by four, a first eccentric cam 28 which is provided for cooperating with a first locking cam 16a and—offset thereto in the peripheral direction—has a second eccentric cam 29 which is provided for cooperating with a second locking cam 16b. The eccentric cams 28 and 29 face radially outward, the locking cams 16a and 16b face radially inward from the respective locking bar 16. The eccentric cams 28 and 29 and the locking cams 16a and 16b are material portions of convex configuration, at least continuous in the region in which in each case a contact point K1, K2 between the eccentric cams 28 and 29 and the respectively assigned locking cams 16a and 16b is able to bear against the respective other contact point.

A spring 35, for example a spiral spring, as is disclosed in DE 10 2009 041 492 A1, the relevant disclosure thereof being expressly included herein, is arranged in a central receiver of one of the two fitting parts 11 and 12, in the present case of the second fitting part 12 and supported in the radial external region of the spring 35 on the second fitting part 12. The spring 35 acts on the eccentric 27, in the present case by being located fixedly in terms of rotation on the drive element 21 on the inside. The eccentric 27 acted upon by the spring 35 acts on the radially movable locking bars 16 and impinges on said locking bars so that they are pushed radially outwards, in order to fall into the toothed ring 17, whereby the fitting 10 is locked.

A control disk 36 is arranged axially in the constructional space between the locking bars 16 and the first fitting part 11 and in the present case is located fixedly in terms of rotation on the eccentric 27. The control disk 36 has—in the present case four—control tracks which in each case cooperate with a projection 38 of each locking bar 16. The projections 38 in this case protrude in the axial direction from the locking bars 16 assigned thereto. With a rotation (by a few degrees) of the drive element 21—and the eccentric 27 and the control disk 36 driven thereby—counter to the force of the spring 35, the control disk 36 pulls the locking bars 16 radially inward, i.e. out of the toothed ring 17, whereby the fitting 10 is unlocked and the two fitting parts 11 and 12 are able to be rotated relative to one another about the axis A. The backrest 4 is now able to be pivoted about the axis A in order to adjust its inclination, i.e. to adopt a further position of use.

The closing direction c of the eccentric 27 is the direction of rotation of the eccentric 27 acting in the closing direction due to the action of the spring 35. Hereinafter, the cooperation of one of the first eccentric cams 28 with the associated first locking cam 16a is considered, wherein the closing direction c in the figures is in the clockwise direction. In the present case, the remaining first eccentric cams 28 cooperate in a similar manner with the first locking cams 16a associated therewith. In a modification of the exemplary embodiment, however, only one first eccentric cam 28 is correspondingly configured.

In the locked state and without additional loading of the backrest 4 (i.e. without external torque and only with the torque required by the weight of the backrest 4) the eccentric 27 acts on the locking bars 16 only by means of the first eccentric cams 28 which in each case act on the associated first locking cams 16a and namely in a first contact point K1 (at which the first eccentric cam 28 and the first locking cam 16a are in contact with one another), whilst between the second eccentric cams 29 and the respectively assigned second locking cams 16b a gap exists of approximately 0.05 to 0.5 mm, preferably approximately 0.25 mm.

If in the locked state a load acts on the backrest 4, the resulting torque attempts to rotate the toothed ring 17 relative to the guide segments 14. The locking bars 16 are guided with clearance between the guide segments 14 and, on the one hand, are in engagement with the toothed ring 17 and, on the other hand, supported on the associated first eccentric cam 28. The torque on the backrest 4, therefore, tilts the locking bars 16, which are slightly movable due to the clearance, between and relative to the guide segments 14.

If the torque (relative to FIGS. 7 to 9) acts counterclockwise on the upper locking bar 16, the locking bar 16 tilts to the left (and comes into contact with the left-hand guide segment 14). The resulting force in the first contact point K1 is increased. If the torque acts clockwise on the backrest 4 (in the figures), the locking bar 16 tilts to the right (and comes into contact with the right-hand guide segment 14). If the torque on the backrest 4 is sufficiently great, for example more than 100 Nm, the second eccentric cam 29 and the second locking cam 16*b* come into contact with one another at a second contact point K2.

Figures 4, 5:
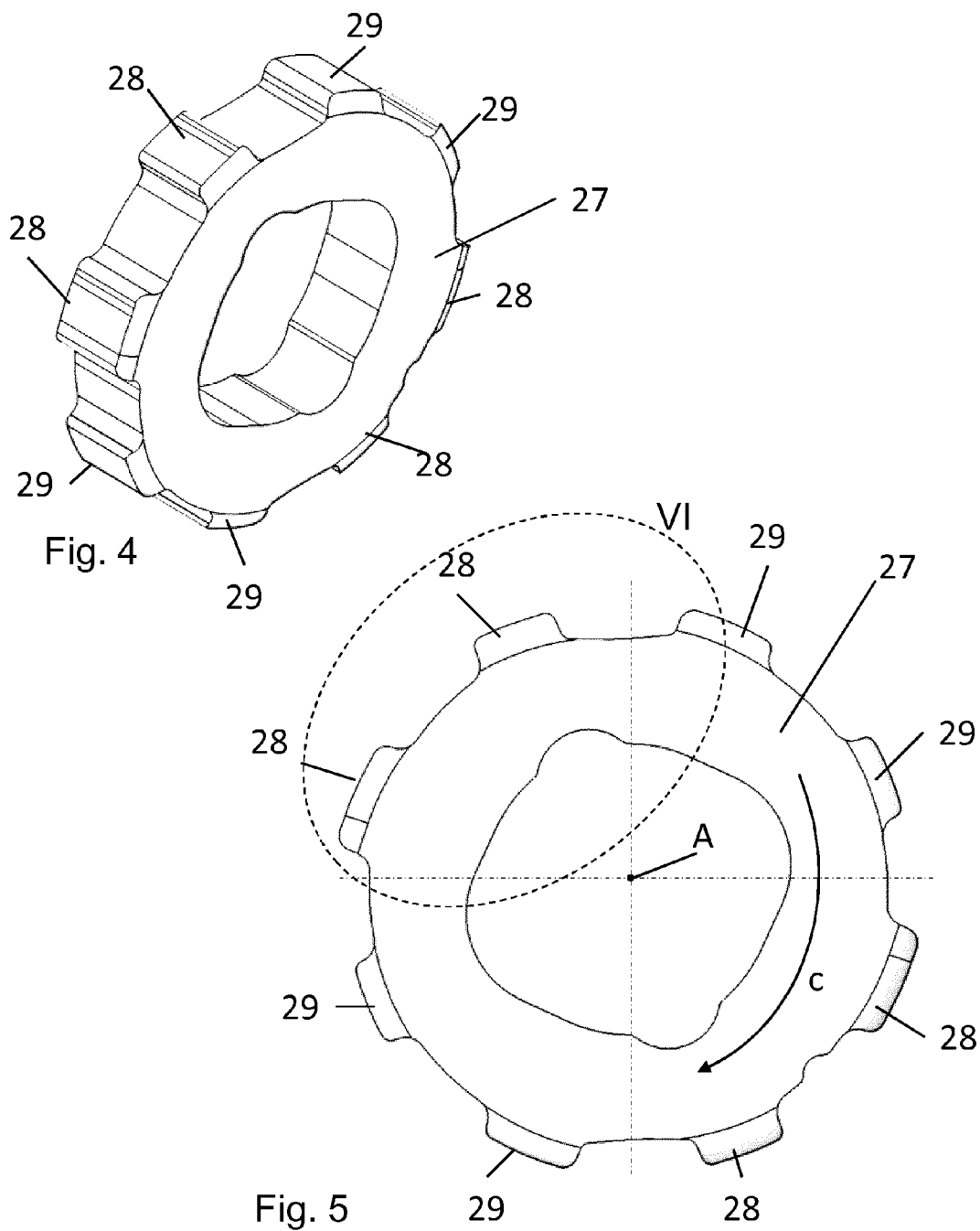
FIG. 4 is a perspective view of the eccentric of the first exemplary embodiment.
FIG. 5 is a front view of the eccentric of the first exemplary embodiment.
Figure 6:
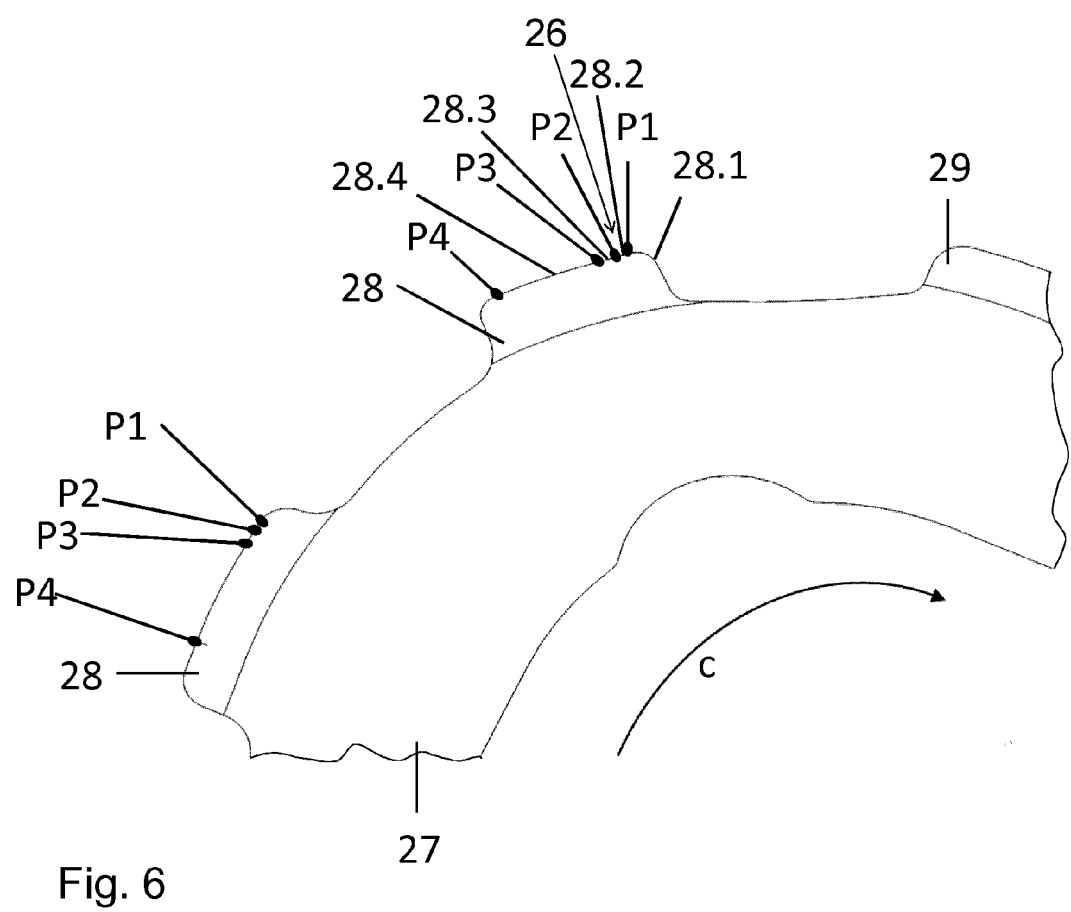
FIG. 6 is a view of a detail VI of FIG. 5.

The situation relative to the tilting of the locking bar 16 on the diagonally opposing locking bar 16 is preferably as described before. In the locking bars 16 arranged adjacent therebetween, a mirror-inverted situation occurs relative to the closing direction c, i.e. these locking bars 16 tilt in the opposing direction and the associated first eccentric cams 28 lead in the closing direction c. In this case, —as is visible in FIG. 5—over the eccentric periphery, two first eccentric cams 28 and two second eccentric cams 29 are always located adjacent to one another. In a modification of the exemplary embodiment, however, the adjacent locking bars may also have the same layout, so that a locking bar is tilted in the same direction and over the entire eccentric periphery in each case a first eccentric cam 28 and a second eccentric cam 29 are alternately located adjacent to one another.

The first eccentric cam 28 is subdivided along its outer contour into a plurality of cam portions of different geometry. Depending on the angular position of the eccentric 27, one or more of these cam portions of the first eccentric cam 28 comes into contact with the first locking cam 16*a* at a first contact point K1. The individual cam portions are separated from one another in the peripheral direction, i.e. in the direction about the axis A through the following described (limit) points. In the axial direction (in the direction of the axis A) the cam portions preferably extend over the entire component width of the eccentric 27. In the eccentric 27 of planar configuration, the component width of the eccentric 27 is defined by the material thickness thereof.

The view counter to the closing direction c starts with a first cam portion 28.1 of the first eccentric cam 28 with a control contour which is defined by a rounded portion of a first flank of the eccentric cam 28 extending in the radial direction with the contour of the eccentric cam 28 extending in the peripheral direction and which controls the introduction of the locking bar 16 into the toothed ring 17, by the first locking cam 16*a* cooperating with this control contour, when the locking bar 16 falls into the toothed ring 17. The first cam portion 28.1 extends as far as a first point P1 when viewed counter to the closing direction c. In a modification of the exemplary embodiment, the first cam portion 28.1 may be dispensed with, by the first flank of the eccentric cam 28 extending in the radial direction being connected to the contour of the eccentric cam 28 extending in the peripheral direction with sharp edges.

A second cam portion 28.2 extends between the first point P1 and a second point P2 located relative to the first point P1 counter to the closing direction c, said second cam portion being characterized by a cam contour 26 extending on each point of the second cam portion 28.2 exactly in the peripheral direction, i.e. which extends exactly concentrically about the axis A, in other words with a wedge angle of 0° relative to the peripheral direction (zero degree contour).

A normal force transmitted from the first locking cam 16*a* to the second cam portion thus passes through the central point of the fitting 10, i.e. through the axis A, so that an opening moment does not act on the eccentric 27. The length of the second cam portion 28.2 corresponds to an angular portion of the eccentric of ca. 1.5°. This corresponds to approximately 5% of the entire eccentric actuating angle of 30°. A reduction in the length of the second cam portion 28.2 to approximately 0°(line contact) is possible in theory. An increase is possible if desired but leads to correspondingly increased actuating angles and actuating energy when unlocking the fitting 10.

A third cam portion 28.3 extends between the second point P2 and a third point P3 located relative to the second point P2 counter to the closing direction c, said third cam forming a continuous transition to a fourth cam portion 28.4.

The fourth cam portion 28.4 extends between the third point P3 and a fourth point P4 located counter to the closing direction c, said fourth cam portion being characterized by a cam contour extending slightly radially outwardly relative to the peripheral direction—viewed counter to the closing direction c—which extends in a wedge angle, in the present case 4° to 6°. The closing direction c indicates how this wedge angle is measured. The wedge angle is positive, i.e. as viewed in the drawings, the regions of the fourth cam portion trailing in the closing direction c protrude further radially outwards than the leading regions so that the locking bar 16 acted upon by the first eccentric cam 28 may be locked and at the same time a compensation of tolerances is possible by a clearance being produced between the first eccentric cam 28 and the first locking cam 16*a* and/or between the toothing of the locking bar 16 and the toothed ring 17 by a wedge action.

In a modification of the exemplary embodiment, the third cam portion 28.3 is dispensed with. The second cam portion 28.2 and the fourth cam portion 28.4 are thus located immediately adjacent to one another. This is possible without functional drawbacks, in particular with small wedge angles of the fourth cam portion 28.4.

A resulting force transmitted from the first locking cam 16*a* to the fourth cam portion 28.4 acts in an opening manner on the eccentric 27 but is compensated in a self-locking manner by the friction between the first eccentric cam 28 and the first locking cam 16*a*.

Viewed counter to the closing direction c, behind the fourth point P4, the cam contour preferably merges with a radius into the second flank of the first eccentric cam 28.

After mounting the fitting 10 a functional test is carried out, in which the important features for assessing the function and safety of the fitting 10 are tested. An important feature is the angular position of the drive element 21 which corresponds to the angular position of the eccentric 27 connected to the drive element 21. The angular position of the drive element 27 corresponds to the actuating angle of the fitting 10 and provides information about the degree of locking of the fitting.

Figure 7:
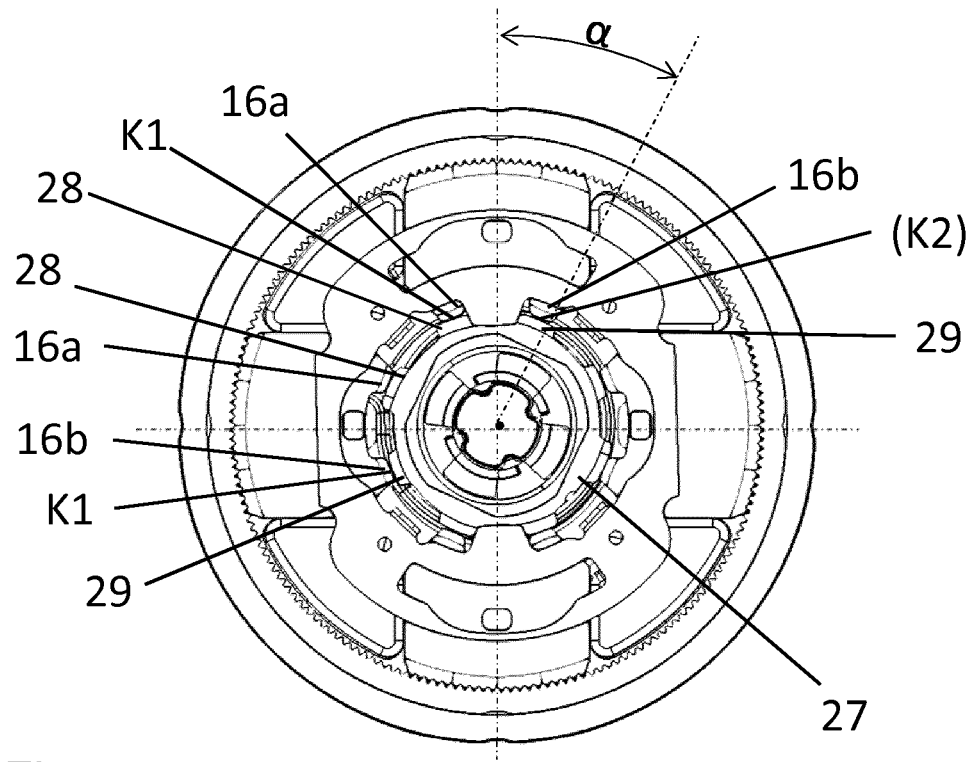
FIG. 7 is a view corresponding to FIG. 3 of a locked fitting with components of nominal size.
Figure 8:
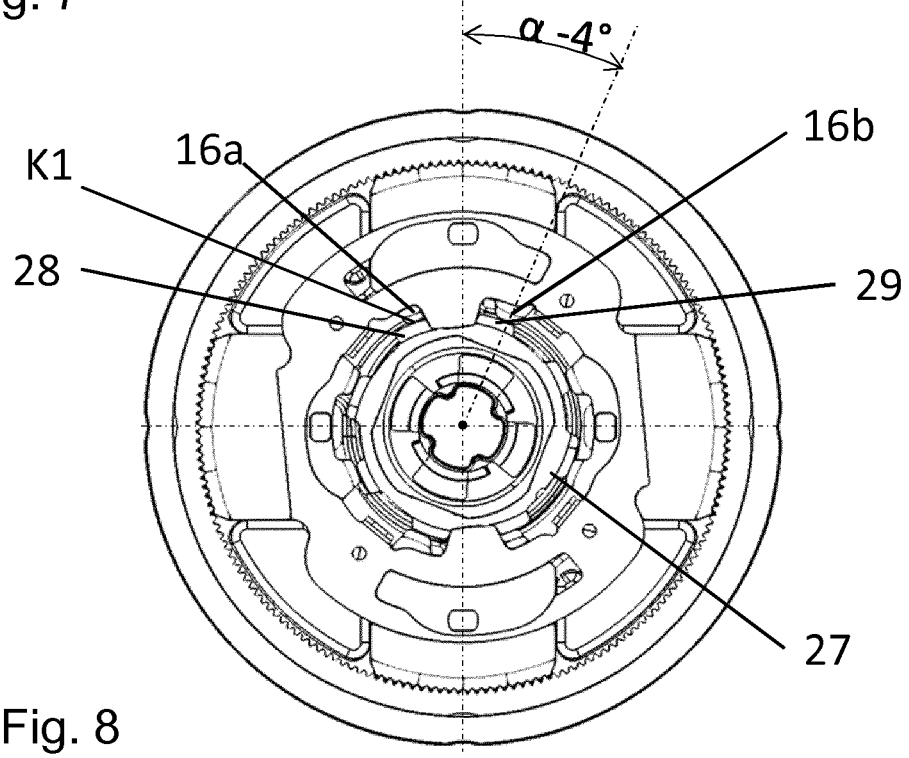
FIG. 8 is a view corresponding to FIG. 7 of a locked fitting with components subjected to the maximum admissible tolerances.
Figure 9:
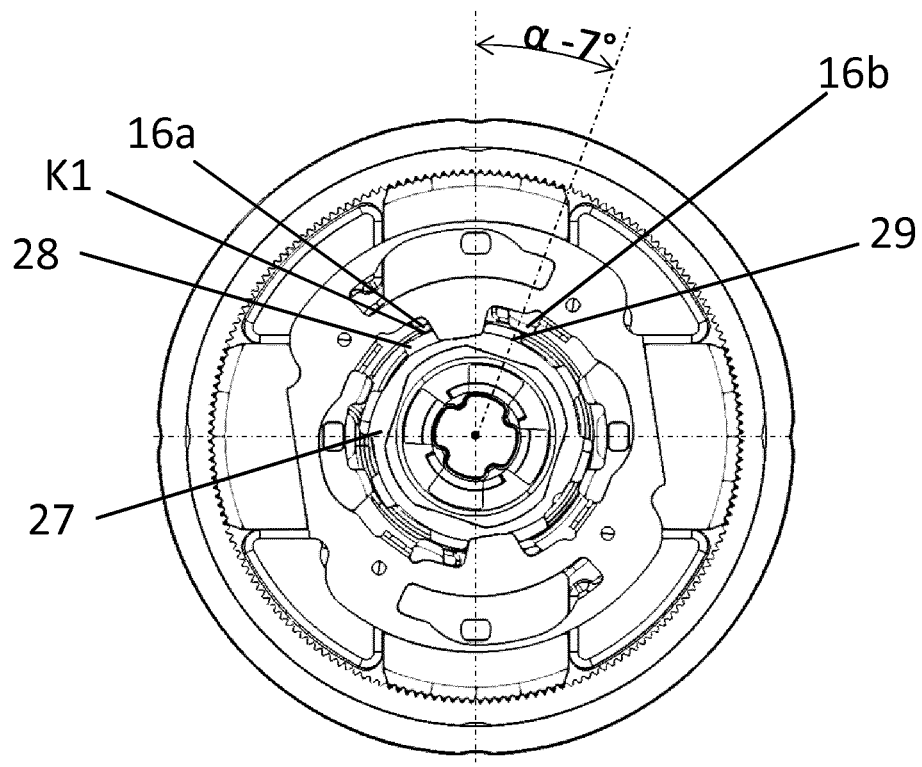
FIG. 9 is a view corresponding to FIG. 7 of a locked fitting with inadmissibly high component tolerances.

In FIGS. 7 to 9, the angular position is shown of the eccentric depending on component tolerances. FIG. 7 shows a locked fitting with components of nominal size. An eccentric angle of nominal size in the closing direction c is measured and in the present case is defined as the angle between, on the one hand, a line from the axis A to the radially extending central line of the locking bar 16 and, on the other hand, a line from the axis A through any measuring point but clearly defined on the second eccentric cam 29 located closest in the closing direction c. The first contact point K1 between the first locking cam 16*a* and the first eccentric cam 28 is located on the fourth cam portion 28.4 (between the third point P3 and the fourth point P4).

FIG. 8 shows a view corresponding to FIG. 7 of a locked fitting with components subjected to tolerance, the tolerances thereof adding up to a maximum permitted overall tolerance acting on the eccentric angle of the eccentric 27. Such overall tolerance results, for example, from a combination of a toothed ring 17 with a diameter which is too small, of a locking bar 16 having a nominal size and an eccentric 27 with an external diameter which is too large in the region of the first eccentric cams 28. The eccentric 27 is then not able to rotate fully in the closing direction c so that the eccentric angle relative to the eccentric angle of nominal size of a fitting 10 with components of nominal size is smaller by ca. 4°. The first contact point K1 between the first locking cam 16a and the first eccentric cam 28, therefore, is located in the third cam portion 28.3 (between the second point P2 and the third point P3) or in the second cam portion 28.2 (between the first point P1 and the second point P2). In loaded conditions, which could lead to an opening of the eccentric 27 without the second cam portion 28.2, optionally after slight rotation counter to the closing direction c, the eccentric 27 would remain in a position in which the first contact point K1 might be in the second cam portion 28.2. A further rotation of the eccentric 27 does not take place as, due to the contour of the second cam portion 28.2 extending concentrically about the axis A (zero degree contour), a force transmitted in the second cam portion 28.2 from the first locking cam 16a to the first eccentric cam 28 does not have an opening force direction.

FIG. 9 shows a view corresponding to FIG. 7 of a locked fitting 10 with component tolerances which are slightly too large and thus inadmissible. The first contact point K1 (between the first locking cam 16a and the first eccentric cam 28), viewed in the closing direction c, is located in front of the second cam portion 28.2. The eccentric angle relative to the eccentric angle of nominal size of the components of nominal size is smaller by ca. 7°. This angular difference may be established reliably during the mounting process by measurement technology, so that a fitting 10 with component tolerances which are too great may be rejected. As the second cam portion 28.2 has a wedge angle of 0° relative to the peripheral direction, the angular deviation of the eccentric angle from the (nominal) eccentric angle is greater than in a fitting with an eccentric without a zero degree contour, in which the wedge angle remains constant even when exceeding the tolerance limit, and exceeding the tolerance limit only results in a very slight angular deviation from the eccentric angle of nominal size. Exceeding the tolerances, therefore, by means of the zero degree contour of the second cam portion 28.2 between the first point P1 and the second point P2 may be identified easily.

Figure 10:
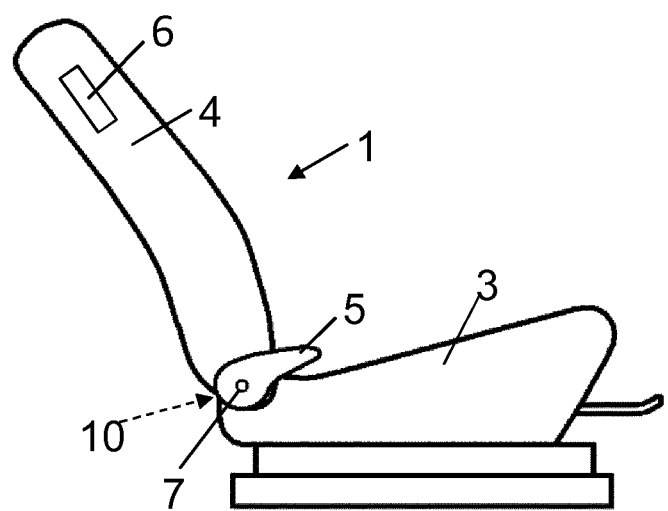
FIG. 10 is a schematic view of a vehicle seat with a fitting according to a second exemplary embodiment.
Figure 11:
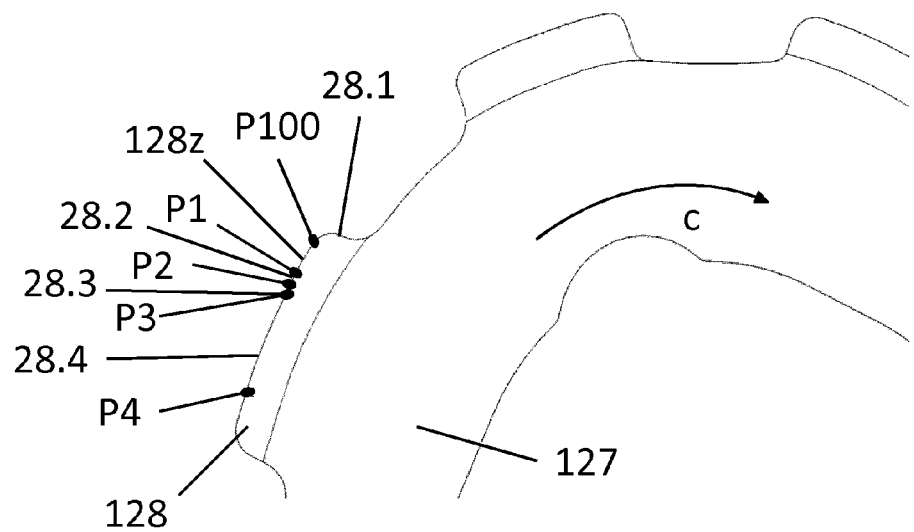
FIG. 11 is a view corresponding to FIG. 6 of the second exemplary embodiment.
Figure 12:
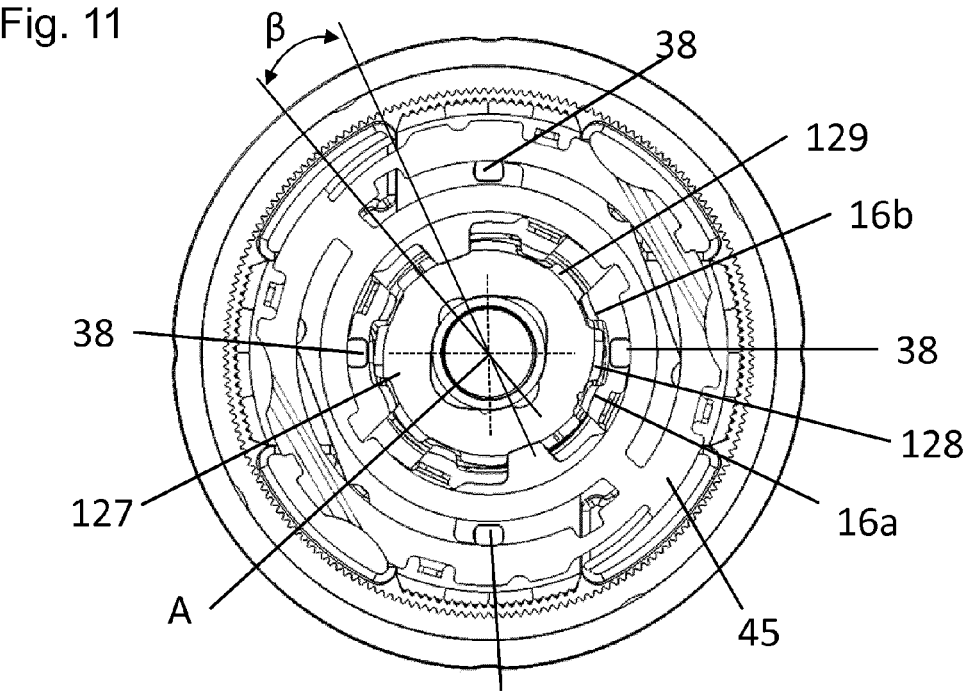
FIG. 12 is a radial sectional view corresponding to FIG. 3 through the second exemplary embodiment in the fully unlocked state.

In a second exemplary embodiment shown in FIGS. 10 to 12, the fitting 10 is a freely pivoting fitting of the fitting system, which additionally has a counter fitting. Such a fitting system is disclosed, for example, in DE 20 2010 015 093 U1. The second exemplary embodiment corresponds substantially to the first exemplary embodiment, which is why only the differences are explained hereinafter. Components which are different from the first exemplary embodiment bear reference numerals increased by 100.

The (freely pivoting) fitting 10 which is actuated via a second hand lever 6 serves together with the counter fitting for locking the free pivoting of the backrest 4. In two-door motor vehicles, the access to a rear seat row is intended to be facilitated by means of the free pivoting of the backrest 4, for which the unlocked backrest 4 is pivoted from one of the positions of use to the front into a freely pivoted position which is not suitable for seating use. It increases the ease of operation if the second hand lever 6 does not have to be held during the entire free pivoting movement, whilst the fittings are only locked in the freely pivoted position. To this end, in the (freely pivoting) fitting 10 an annular freely pivoting control element 45 is provided between the control disk 36 and the first fitting part 11 about the axis A, said annular freely pivoting control element being connected fixedly in terms of rotation to the first fitting part 11. The freely pivoting control element 45 has stop tracks which cooperate with lugs 38 of the locking bars 16, by limiting the movement of the locking bars 16 radially outwardly or permitting said locking bar to fall unhindered into the toothed ring 17 depending on the angular position of the freely pivoting control element 45.

The eccentric 127 of the fitting 10 in the unlocked state is rotated sufficiently far counter to the closing direction c that the first and/or second locking cams 16a, 16b of the locking bars 16, pulled radially inwardly, are located in the intermediate spaces between the side contours of the first and second eccentric cams 128, 129 extending in the radial direction. The stop tracks of the freely pivoting control element 45 hold the locking bars 16 pulled inwardly, provided the backrest 4 is not pivoted back. The eccentric 127 is prevented from rotating by at least one of the first and/or second eccentric cams 128, 129 bearing in the peripheral direction on at least one of the first and/or second locking cams 16a, 16b.

The (freely) pivoting fitting 10 has means by which the fitting 10 and the counter fitting may be operatively connected together, in particular by means of a Bowden cable. The unlocked (freely) pivoting fitting 10 keeps the additionally unlocked counter fitting in the unlocked position. Relative to the first eccentric cam 28 of the first exemplary embodiment, between the first cam portion 28.1 and the second cam portion 28.2 the first eccentric cam 128 has an additional cam portion 128z arranged between an additional point P100 and the first point P1, which—viewed counter to the closing direction—preferably has a cam contour which extends slightly radially outwards relative to the peripheral direction. Due to the additional cam portion 128z the width of the first eccentric cam 128 in the peripheral direction is larger than the width of the first eccentric cam 28 of the first exemplary embodiment (and larger than the width of the first eccentric cam of the counter fitting).

Tolerances in the fitting system, for example a loose portion in the Bowden cable between the (freely pivoting) fitting 10 and the counter fitting are compensated by the additional cam portion 128z of the first eccentric cam 128 by the open eccentric 127 having a larger retaining angle due to the wider first eccentric cam 128. The retaining angle describes the angle of the eccentric 127 about the axis A between the locked position and the position of the eccentric 127 held open by the bearing of the first and/or second locking cams 16a, 16b on the first and/or second eccentric cams 128, 129.

In the second exemplary embodiment the second eccentric cams 129 also have such an additional cam portion.

The features disclosed in the above description, the claims and the drawings may be significant both individually and in combination for implementing the invention in its different embodiments.

While specific embodiments of the invention have been shown and described in detail to illustrate the application of the principles of the invention, it will be understood that the invention may be embodied otherwise without departing from such principles.

The invention claimed is:
1. A fitting for a vehicle seat, the fitting comprising:
a first fitting part;
a second fitting part to be rotated relative to the first fitting part about an axis;
a toothed ring formed on the first fitting part;
guide segments formed on the second fitting part;

a locking bar radially displaceably guided by said guide segments between a locked state and an unlocked state, wherein the locked state cooperates with the toothed ring to lock the fitting and the locking bar has a first locking cam and a second locking cam;

a rotatably mounted eccentric, wherein:

during a transition from the unlocked state into the locked state, the eccentric is rotated in a closing direction and subjects the locking bar to a force for clamping the locking bar against the toothed ring;

for acting on the locking bar the eccentric comprises a first eccentric cam cooperating with the first locking cam and a second eccentric cam cooperating with the second locking cam;

the first eccentric cam has a cam portion which extends in a peripheral direction concentrically about the axis;

the cam portion is arranged counter to the closing direction in front of a further cam portion of the first eccentric cam; and the further cam portion, counter to the closing direction, has a cam contour which extends radially outwardly relative to a concentric peripheral contour, for clamping the locking bar against the toothed ring.

2. The fitting as claimed in claim 1, wherein the first eccentric cam has another cam portion as a first cam portion which defines a control contour by means of a rounded portion of a first flank of the eccentric cam extending substantially in the radial direction, with a contour of the eccentric cam extending substantially in the peripheral direction, and during the locking of the fitting the control contour controls the introduction of the locking bar into the toothed ring.

3. The fitting as claimed in claim 2, wherein the cam portion, which extends in a peripheral direction concentrically about the axis, is a second cam portion counter to the closing direction that is adjacent to the first cam portion.

4. The fitting as claimed in claim 3, wherein:

a fourth cam portion, counter to the closing direction, is arranged behind the second cam portion; and the fourth cam portion, counter to the closing direction, has a cam contour extending radially outwardly relative to a concentric peripheral contour, for clamping the locking bar in the toothed ring.

5. The fitting as claimed in claim 3, wherein:

a fourth cam portion, counter to the closing direction, is arranged behind the second cam portion;

a third cam portion is provided between the second cam portion and the fourth cam portion;

the third cam portion connects together continuously the second cam portion and the fourth cam portion.

6. The fitting as claimed in claim 2, wherein:

the first eccentric cam has an additional cam portion counter to the closing direction and adjacent to the first cam portion; and the additional cam portion, in the closing direction, has a cam contour extending radially outwardly relative to a concentric peripheral contour.

7. The fitting as claimed in claim 6, wherein the cam portion which extends in a peripheral direction concentrically about the axis is a second cam portion and is adjacent to the additional cam portion.

8. The fitting as claimed in claim 1, wherein:

in the locked unloaded state of the fitting, the first eccentric cam, in a first contact point, is in contact with the first locking cam and a gap exists between the second eccentric cam and the second locking cam; and in the locked loaded state of the fitting, the locking bar is tilted between the guide segments and, as a result, the first eccentric cam is in contact with the first locking cam in the first contact point and the second eccentric cam is in contact with the second locking cam in a second contact point.

9. The fitting as claimed in claim 8, wherein the gap between the second eccentric cam and the second locking cam is 0.05 mm to 0.5 mm.

10. The fitting as claimed in claim 8, further comprising three additional locking bars such that four locking bars are provided, each of the locking bars in a normal case tilting in a direction opposing a respectively adjacent locking bars when the fitting is locked.

11. The fitting as claimed in claim 1, wherein the cam contour extending radially outwardly has a wedge angle of 4° to 6°.

12. The fitting as claimed in claim 1, further comprising an additional locking bar such that at least two locking bars are provided for only one said eccentric comprising the first eccentric cam and the second eccentric cam.

13. The fitting as claimed in claim 12, wherein only the first eccentric has a cam portion extending concentrically about the axis.

14. A motor vehicle seat comprising a least one fitting, the fitting comprising:

a first fitting part;

a second fitting part to be rotated relative to the first fitting part about an axis;

a toothed ring formed on the first fitting part;

guide segments formed on the second fitting part;

a locking bar radially displaceably guided by said guide segments between a locked state and an unlocked state, wherein the locked state cooperates with the toothed ring to lock the fitting and the locking bar has a first locking cam and a second locking cam;

a rotatably mounted eccentric, wherein:

during a transition from the unlocked state into the locked state, the eccentric is rotated in a closing direction and subjects the locking bar to a force for clamping the locking bar against the toothed ring;

for acting on the locking bar the eccentric comprises a first eccentric cam cooperating with the first locking cam and a second eccentric cam cooperating with the second locking cam;

the first eccentric cam has a cam portion which extends in a peripheral direction concentrically about the axis;

the cam portion is arranged counter to the closing direction in front of a further cam portion of the first eccentric cam; and the further cam portion, counter to the closing direction, has a cam contour which extends radially outwardly relative to a concentric peripheral contour, for clamping the locking bar against the toothed ring.

15. The vehicle seat as claimed in claim 14, further comprising:

a seat part connected to one of the two fitting parts; and a backrest connected to the other of the two fitting parts.

* * * * *